United States Patent [19]
Jenkins

[11] Patent Number: 5,352,419
[45] Date of Patent: Oct. 4, 1994

[54] RECOVERY OF ALUMINIUM AND FLUORIDE VALUES FROM SPENT POT LINING

[75] Inventor: David H. Jenkins, Ormond, Australia

[73] Assignee: Comalco Aluminium Limited, Melbourne, Australia

[21] Appl. No.: 74,839

[22] PCT Filed: Jan. 6, 1992

[86] PCT No.: PCT/AU92/00004
§ 371 Date: Jun. 15, 1993
§ 102(e) Date: Jun. 15, 1993

[87] PCT Pub. No.: WO92/12268
PCT Pub. Date: Jul. 23, 1992

[30] Foreign Application Priority Data
Jan. 11, 1991 [AU] Australia ............... PK4188

[51] Int. Cl.$^5$ .................................. C01F 7/50
[52] U.S. Cl. ............................ 423/126; 423/132; 423/489
[58] Field of Search ............... 423/126, 132, 489

[56] References Cited

U.S. PATENT DOCUMENTS

| | | | |
|---|---|---|---|
| 4,444,740 | 4/1984 | Snodgrass et al. | 423/489 |
| 4,597,953 | 7/1986 | Bush | 423/132 |
| 4,735,784 | 4/1988 | Davis et al. | 423/111 |
| 4,816,122 | 3/1989 | Lever | 423/126 |
| 4,889,695 | 12/1989 | Bush | 423/132 |
| 5,024,822 | 6/1991 | Hittner et al. | 423/111 |

*Primary Examiner*—Wayne Langel
*Attorney, Agent, or Firm*—Nikaido, Marmelstein, Murray & Oram

[57] ABSTRACT

Process for the recovery of aluminum and fluoride values from spent pot lining materials comprising the steps of calcining spent pot lining material to produce an ash having environmentally acceptable levels of cyanide contamination, subjecting the ash to a leaching step in a solution containing a mineral acid and a corresponding aluminum salt in such proportions as to dissolve the aluminum and fluoride values, and subjecting the leached liquid to thermal hydrolysis to cause precipitation of an aluminum fluoride product.

11 Claims, 4 Drawing Sheets

RECOVERY OF ALUMINIUM AND FLUORIDE VALUES FROM SPENT POT LINING

FIELD OF INVENTION

This invention relates to the recovery of fluorine and aluminum values from waste materials, and more particularly to the recovery of aluminium fluoride from spent pot lining materials obtained from electrolytic reduction cells used to produce aluminium metal.

BACKGROUND OF THE INVENTION

The carbon lining which forms the internal, side and bottom walls of an electrolytic reduction cell gradually degrades due to the extremely high temperatures and the corrosive conditions that exist during operation of the cell. This degradation gradually causes failure of the carbon blocks which make up the cell, allowing molten aluminium to penetrate the carbon blocks which often causes distortion of the cell. At this stage the cell is removed from service in the pot line. In addition to the carbonaceous cathode material, the refractory and insulating materials that surround the cell as well as the steel cathode bars imbedded in the bottom of the cell are also removed. This material is called spent pot lining or SPL.

During its life the carbon lining of the electrolysis cell absorbs quantities of the bath materials which include aluminium metal, sodium aluminium fluorides and other fluorides. Aluminium carbides and nitrides are also formed during cell operation and these are also deposited in the carbonaceous cathode material. Spent pot lining is currently listed as a hazardous waste by the U.S. Environmental Protection Agency as it contains potentially harmful leachable cyanides and fluorides that can enter the ground water during open air storage. As well, ammonia, hydrogen, hydrogen cyanide, methane and phosphine are produced when the material becomes wet. Various disposal techniques where the SPL can either be destroyed or the materials in the SPL used in other industrial processes have been developed over the years. However, of these processes none has been accepted as standard practice in the industry.

These include processes where the spent pot lining can be used as a replacement for fluorspar in the steel industry or where the carbon values of the spent pot lining are used as a supplementary source of fuel. For example spent pot lining has been burnt in cement kilns and here the cyanide is destroyed while both the carbonaceous material and the fluoride values are used.

Although fluidized bed combustion techniques for disposing a spent pot lining has been demonstrated on a pilot scale, this technique has yet to be demonstrated on a commercial scale. While the cyanide levels of the spent pot lining have been reduced to acceptable levels in such instances, the ash still contains the fluorides which have to be immobilized for example with calcium hydroxide, if the ash is to be disposed as landfill.

As the spent pot lining contains significant amounts of fluorine containing chemicals as well as appreciable amounts of aluminium which can be recycled into the aluminium smelting process, there is an economic incentive both for recovering these values and for producing a spent pot lining residue which can be disposed in an environmentally acceptable manner.

Examples of processes aimed at recovering aluminium fluoride from spent pot lining materials are to be found in U.S. Pat. Nos. 4,508,689 Bush et al, 4,597,953 Bush and 4,889,695 Bush. In these processes, the pot lining material is crushed and leached to extract the fluoride and aluminium values. However, the processes described in the above patents do not address the problem of disposal of the potentially dangerous cyanide containing residue and the fluoride and aluminium value recovery rate is not particularly high.

A membrane process for treating SPL has been developed which uses low temperature solution processing using the well known cryolite recovery technology. However, the solution still contains silica, aluminium, iron and cyanide and these components can lead to membrane fouling.

SUMMARY OF INVENTION AND OBJECT

It is an object of the present invention to provide an improved process for the recovery of aluminium and fluoride values from SPL in which the difficulties associated with cyanide contaminated residues are significantly reduced.

The invention provides a process for the recovery of aluminium and fluoride values from spent pot lining materials, comprising the steps of calcining spent pot lining material to produce an ash having environmentally acceptable levels of cyanide contamination, subjecting the ash to a leaching step in a solution containing a mineral acid and a corresponding aluminium salt in such proportions as to dissolve the aluminium and fluoride values, and subjecting the leached liquid to thermal hydrolysis to cause precipitation of an aluminium fluoride product.

It will be appreciated that the process defined above produces a relatively high purity aluminium fluoride product without the use of caustic soda solutions, thereby reducing the amount of by-product liquors that need to be treated. Similarly, since the SPL ash which is subjected to the leaching step is substantially free of cyanide contamination, the process according to the invention represents an environmentally acceptable process for the recovery of an aluminium fluoride product from the spent pot lining material. In addition, the calcining of the SPL not only substantially removes cyanide contamination, it also significantly frees the aluminium and fluorine values for recovery by the chosen leaching process thereby maximising the desired recovery process.

In a preferred form of the invention, the SPL is first crushed to a particle size less than 600 micrometers and the particles are subjected to calcination in a furnace operating at a temperature in the range 680° C. to 850° C. to produce a low-cyanide ash. The ash is then added to a solution containing a mineral acid comprising hydrochloric, sulfuric or nitric, or mixtures thereof, and the equivalent aluminium salt, i.e. aluminium chloride, aluminium sulphate or aluminium nitrate. The amount of water used is such that the ratio of water to SPL ash is in the range 5 to 25. The amount of aluminium salt used is such that the salt to SPL ash ratio is in the range 0.1 to 0.8 while the ratio of acid to SPL ash is in the range 0.1 to 1.2. The SPL ash is leached with agitation at temperatures between 40° and 100° C. The time of leaching being between 5 and 360 minutes. In some instances it may be preferable to add the aluminium salt after the SPL has been partially leached with the acid only. Another method of adding the aluminium salt to get the above salt to SPL ash ratio is to produce it in-situ by reacting an aluminium compound e.g. aluminium hydroxide with the appropriate acid.

An alternative and preferred ash dissolution method, to prevent silica dissolution is as follows. The spent pot lining ash is first mixed with concentrated sulfuric acid. Water is then added to the acid/SPL ash mixture and the resultant mixture is allowed to age at temperatures between ambient and 150° C. for times up to 24 hours. The aged acid/SPL mixture is then leached with an aluminium sulphate solution to produce an $Al_2(SO_4)_3/H_2SO_4$ ratio in the range 0.75 to 1 and at temperatures up to 100° C. and for times up to 3 hours. The leach liquor is then filtered from the residue which contains mainly carbon and silicate material.

The filtrates from the acid leaching processes, which contain aluminium, sodium, iron and minor amounts of calcium and magnesium as well as the fluoride and the anion of the leaching acid is then placed in an autoclave. The vapor space above the liquid is purged of air with an inert gas to exclude oxygen and the over-pressure above the liquid is adjusted with the inert gas in order to prevent precipitation of iron oxide. The pressure above the liquid before heating commences may be between atmospheric and 2000 kPa. Alternatively, the vapor space above the liquid may be evacuated to achieve similar results.

The contents of the autoclave are then heated with agitation at temperatures from about 105° C. with a corresponding pressure of about 20 kPa to about 265° C. with a corresponding pressure of about 5000 kPa. Depending on the temperatures used the holding times vary from 1 minute to over 5 hours. At the conclusion of the hydrothermal precipitation the reactor is cooled and the pressure reduced to atmospheric. The solution contains a white solid which is filtered from the barren liquor and dried. X-Ray Diffraction scans on the dried powder show it to be $Al(OH,F), 0.375 H_2O$.

The alternative processes outlined above are shown schematically in FIG. 4 of the drawings.

It will be appreciated that one of the major advantages of this preferred processing method is the production of an aluminium fluoride product low in silica and iron. Since this method of processing is, for this reason, also likely to be useful in the processing of uncalcined pot lining materials, a further aspect of the invention provides: a method of processing spent pot lining materials to produce a product containing aluminium and fluoride values which is low in iron and silica, comprising mixing the spent pot lining material with a concentrated mineral acid solution, ageing the mixture for a period of up to about 24 hours to prevent dissolution of the silica contained in the mixture, leaching the mixture by the addition of an aluminium salt corresponding to the mineral acid in such proportions as to dissolve the aluminium and fluoride values, and subjecting the leached liquid to thermal hydrolysis in the presence of an inert atmosphere or vacuum to prevent precipitation of the iron in the leached liquid and to cause precipitation of a product containing aluminium and fluoride values.

One significant disadvantage of the above method using uncalcined spent pot lining materials is the presence of cyanide contamination in the leached liquid, and for this reason it is preferred that the spent pot lining materials should be calcined in the manner defined above before performing the method last defined above. However, it may nevertheless be sufficiently advantageous to have a precipitate substantially free of iron and silica to warrant the separate treatment of the leached liquid following precipitation to remove the cyanide contamination. In this regard, it will be appreciated from a consideration of U.S. Pat. No. 4,889,695 that a separate and distinct deironing step is usually necessary and that the process described in this patent does not address the question of silica contamination and its attendant disadvantages.

BRIEF DESCRIPTION OF THE DRAWINGS

The following examples illustrate the invention and are described with reference to the accompanying drawings in which.

The invention is more clearly illustrated by the following examples which are intended to be illustrative only and should not be taken as limiting the invention in any manner. The SPL ash referred to in the following examples was prepared in a fluidized bed contactor of the type described in our copending International Patent Application PCT/AU91/00342 in the name of Comalco Aluminium Limited, the contents of which are incorporated hereby by cross-reference. The crushed spent pot lining material, having a particle size of less than 600 micrometers, was subjected to calcining temperatures in the range 680° C. to 850° C., and most typically about 720° C.

Test Details

The feed material was less than 600 micrometers low carbon SPL. A typical composition is shown in Table 1.

TABLE 1

| TYPICAL −600 MICROMETERS LOW CARBON FEED COMPOSITION | | | | | |
|---|---|---|---|---|---|
| % wt | | | | | |
| C | Al | Si | Na | F | ppm CN |
| 16.9 | 22.5 | 7.8 | 11.7 | 13.3 | 200–500 |

The tests were conducted under the following conditions:
Bed Temperature (Target) = 720° C.
Fluidizing air rate = 185 kg/hr
Chamber pressure = −40 mm $H_2O$ (gauge)
Feedrate = 28 kg/hr During the tests, samples of product ash were collected hourly for chemical and screen analysis. Gaseous cyanide fluoride and sodium emissions were sampled from the exhaust duct. The mass flowrate of all solid streams was measured hourly and all relevant variables were logged continuously from the microprocessor onto magnetic disk.

RESULTS AND DISCUSSION

System Performance

Figure 1:
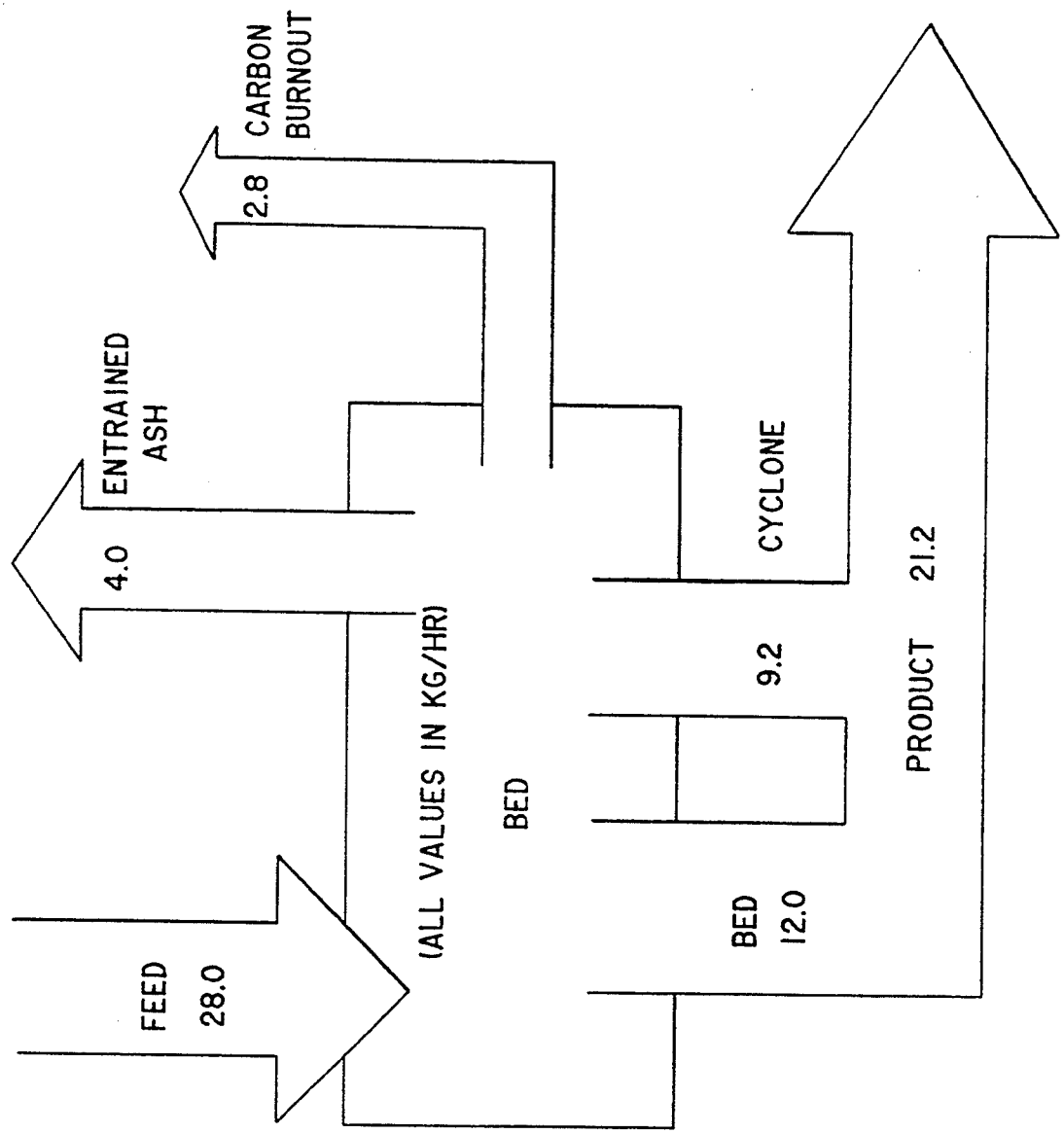
FIG. 1 is a Sankey diagram showing the mass balance of a system embodying the invention.

The two 5-hour tests proceeded smoothly with no operational problems. No agglomeration was encountered in the system. The mass balance is presented in Sankey diagram form in FIG. 1.

Total Cyanide Content

Figure 2:
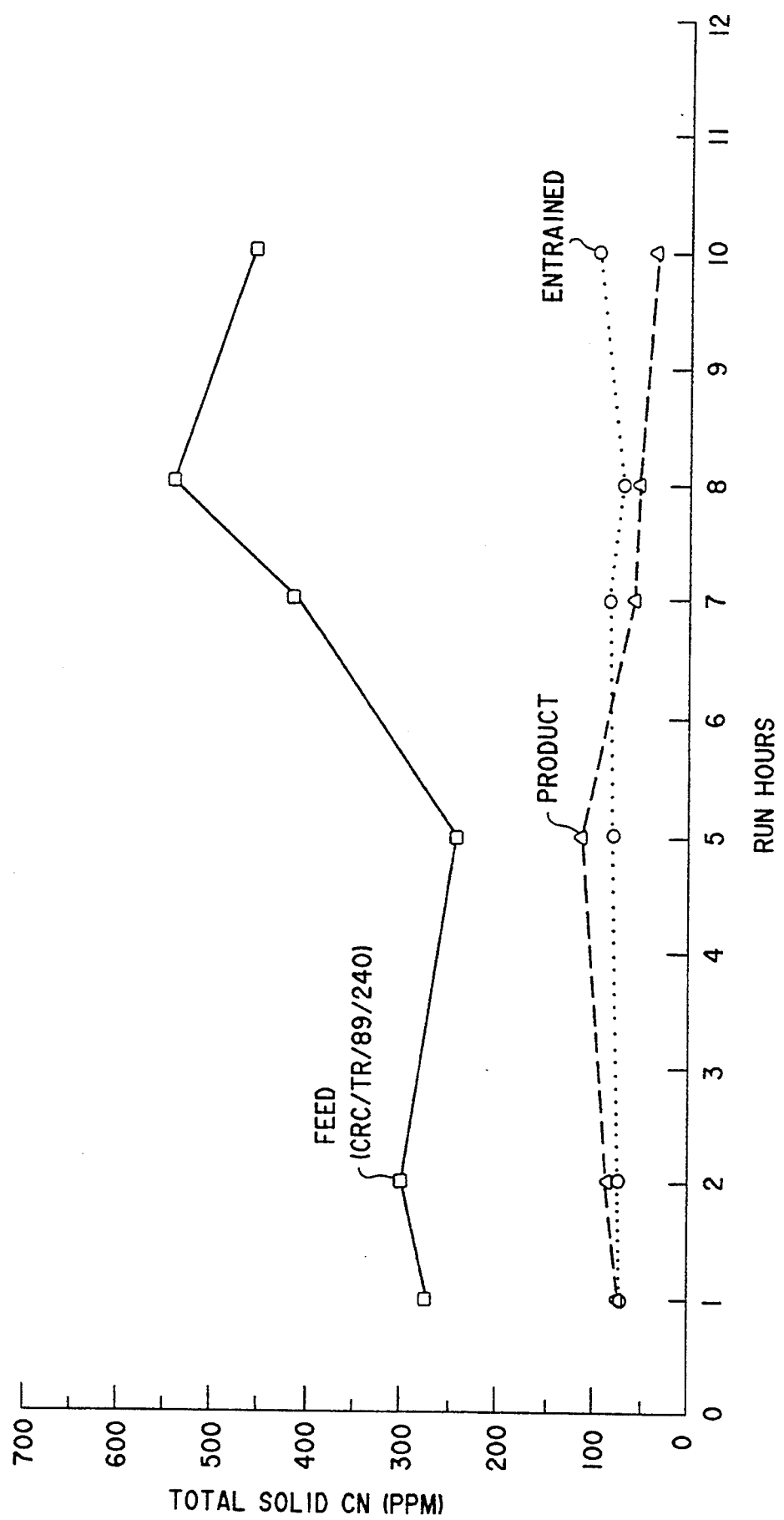
FIG. 2 is a graph showing the total cyanide content of the products streams throughout the test.

FIG. 2 shows the total cyanide content of the product streams throughout the test. The cyanide content of a typical low carbon feed is shown for comparison. The reduction in total solid cyanide is 80%-from 340 ppm in the feed to 70 ppm in the combined product.

Carbon Burn-out

Figure 3:
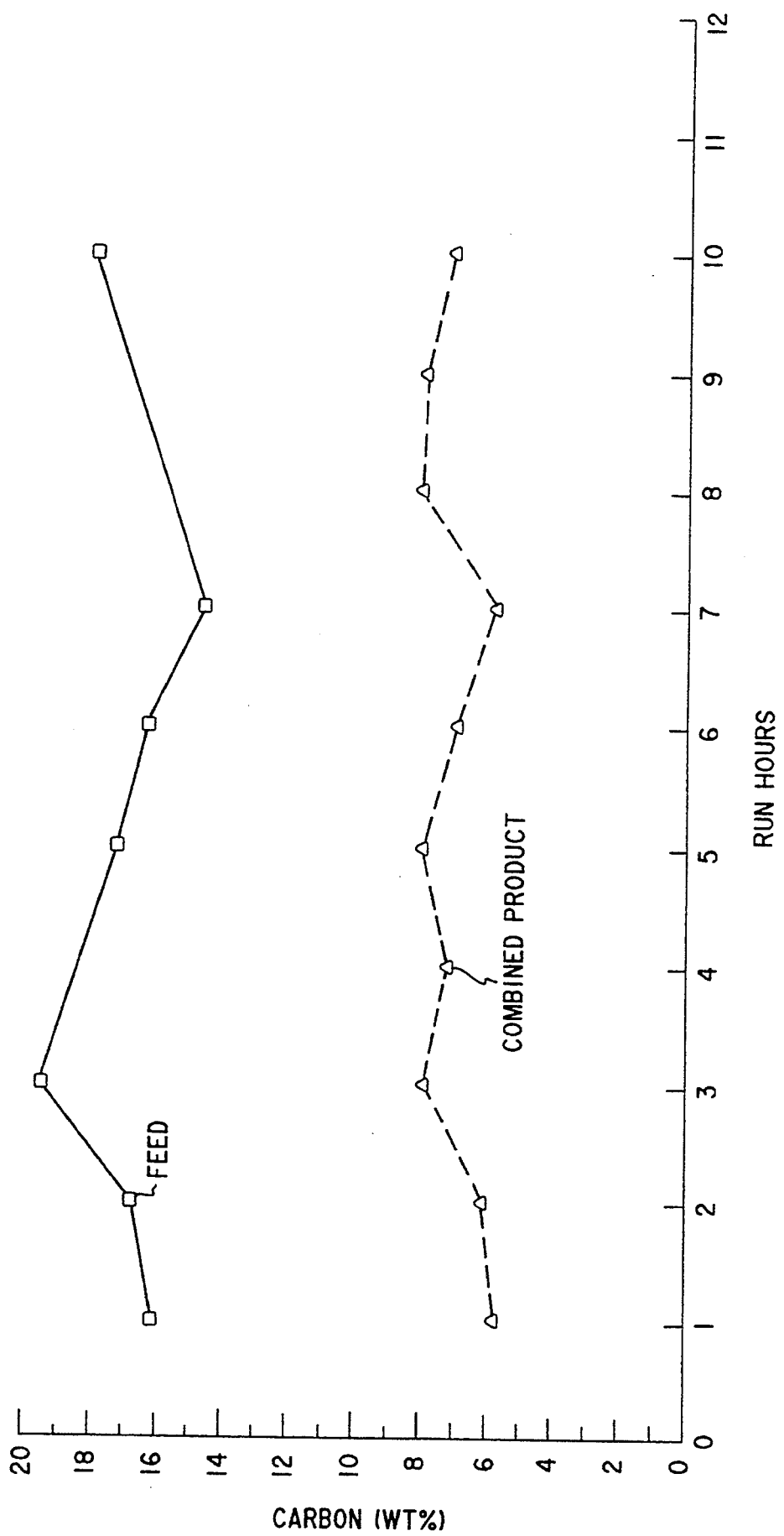
FIG. 3 is a graph showing the carbon content of the feed and product during the test.

The carbon content of feed and product throughout the test is shown in FIG. 3. Average carbon burn-out was 58%.

Gaseous Emissions

During each of the 5-hour test periods, 2 samples of off-gas were taken and independently analysed for gaseous $F^-$ $CN^-$ and Na. The full NATA report is summarized in Table 2.

TABLE 2

OFF-GAS ANALYSIS

| Sample Period | T(°C.) at Sampling | Mass flow (mg/hr) | F Concn. (ppm) | % Volat. | Mass flow (mg/hr) | CN Concn. (ppm) | % Volat. |
|---|---|---|---|---|---|---|---|
| 1* | 536 | 960 | 5.82 | <0.1 | 55.8 | 0.27 | 0.6 |
| 2 | 552 | 90 | 0.55 | <0.01 | 29.4 | 0.14 | 0.3 |
| 3 | 561 | 66 | 0.44 | <0.01 | 31.2 | 0.16 | 0.3 |
| 4 | 558 | 72 | 0.45 | <0.01 | 30.06 | 0.15 | 0.3 |

*Particulate breakthrough occurred during sampling
Examples of the leaching and pressure precipitation steps defined above are as follows:

EXAMPLE I

Thirty grams of SPL ash was mixed with 12.0 grams of concentrated sulfuric acid. When this was well mixed 3.7 grams of water was added and the mixture was allowed to age at room temperature for 2 hours. The aged mixture was added to 470.0 grams of water to which 35.0 grams of $Al_2(SO_4)_3$, $18H_2O$ had previously been added. The temperature of the solution was gradually increased to 93° C. over an hour. The solution was allowed to cool overnight and was filtered the next morning. X-Ray Fluorescent analysis of the dried leach residue indicated that 97% of the fluorine, 47% of the aluminium, 69% of the iron and 96% of the sodium had been extracted from the SPL ash. ICP analysis of the solution showed that it contained 84.1 g/l $SO_4$, 0.7 g/l Fe, 18.2 g/l Al, 16.4 g/l Na and 1.0 g/l $SiO_2$.

EXAMPLE II

A second 30.0 grams of SPL ash was again mixed with 12.0 grams of concentrated sulfuric acid but in this case 5.5 grams of water was added to the mixture. The mixture was again aged at room temperature for 2 hours. The aged mixture was added to 470.0 grams of water containing 35.0 grams of $Al_2(SO_4)_3$, $18H_2O$ which was heated to 80° C. The solution temperature was gradually increased to 91° C. over an hour. The solution cooled overnight and was filtered the next morning. X-Ray Fluorescent analysis of the dried leach residue showed that 98% of the fluorine, 47% of the aluminium, 72% of the iron and 96% of the sodium had been extracted from the SPL ash. In this case the solution contained 86.6 g/L $SO_4$, 0.7 g/l Fe, 19.1 g/l Al, 17.0 g/l Na and 0.9 g/l $SiO_2$.

EXAMPLE III

A solution was prepared which contained 305.96 g of the leach solution from example I and 965.80 g of the leach solution from example II. This was added to an autoclave and heated to 200° C. and held at this temperature for 3 hours. During the heating time the solution was agitated at 500 rpm. When the autoclave had cooled and was opened the solution contained a pale pink solid. Upon filtering and drying 28.55 grams of a pink solid was obtained, X-Ray diffraction of the dried solid showed that it contained $Al(OH,F)_3$ 0.375 $H_2O$ and $Fe_2O_3$. X-Ray Fluorescent analysis of the dried solid showed that it contained 26.6% F, 24.8% Al, 0.21% Fe, 1.3% Na, 0.08% Mg and 0.16% Ca. The silica content was below 0.2%.

EXAMPLE IV 607 grams of a solution prepared in a similar manner to those in examples I and II was added to the autoclave. Dry nitrogen was admitted for five minutes to displace the air above the liquid. The nitrogen over-pressure was then increased so that the pressure above the liquid was 210 kPa. The solution was then heated to 150° C. while it was being agitated at 500 rpm. It was held at this temperature for 1 hour. When the autoclave was cool the slurry was filtered and the solids dried. From this test 18.15 grams of white powder were obtained which XRD analysis identified as $Al(OH,F)_3$, 0.375 $H_2O$. The solids were analysed by XRF and gave the following analysis; 0.15% CaO, 0.05% $Fe_2O_3$, 0.06% $P_2O_5$, 47.41% $Al_2O_3$, 0.21% MgO, 0.35% $Na_2O$ and 25.89% F. Silica and $K_2O$ were below the detection limit of the equipment. Loss on Fusion of the sample was 26.32%.

EXAMPLE V 607 grams of a solution prepared as for the previous example was added to the autoclave. Dry nitrogen was used to purge the air from above the liquid for 5 minutes. The nitrogen over-pressure was then increased to 210 kPa. The solution was heated to 200° C. while agitating at 300 rpm and held at this temperature for 63 minutes. When the autoclave was cool the slurry was filtered and the solids dried. From this test 22.13 grams of white powder was obtained. XRF analysis showed that it contained 0.20% CaO, 0.05% $Fe_2O_3$, 0.04% $P_2O_5$, 49.12% $Al_2O_3$, 0.22% MgO, 1.105 $Na_2O$ and 25.99% F. Silica and $K_2O$ were again below the detection limit of the equipment. Loss on Fusion of this sample was 24.01%.

Figure 4:
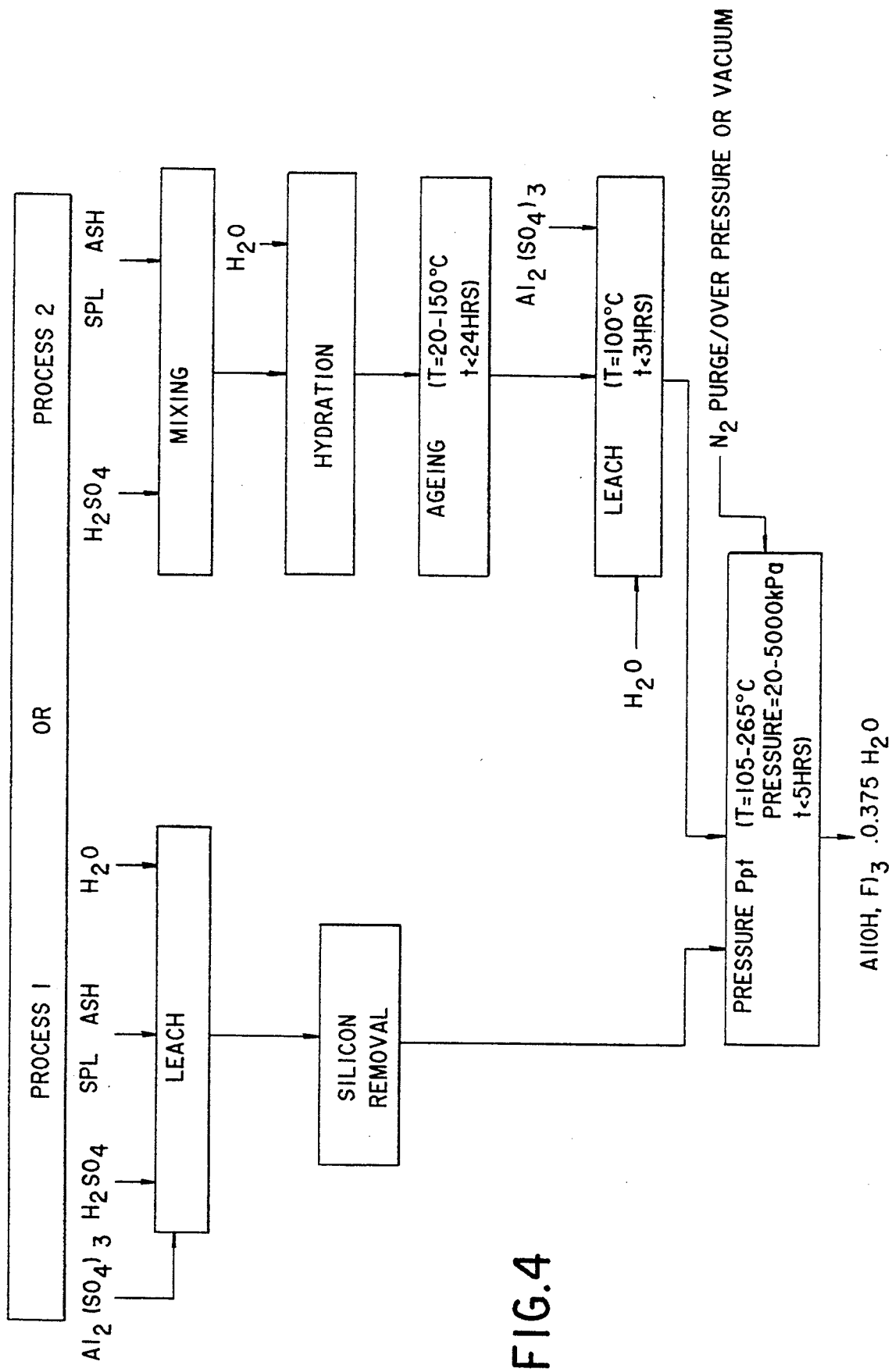
FIG. 4 is a schematic flow diagram illustrating the steps involved in the alternative processes embodying the invention.

Tables 4 and 5 detail the temperature, pressure and time parameters of further experimental tests conducted in accordance with the invention, while Table 4 details the sample analysis of five of the tests to illustrate the significantly reduced silica content of samples treated by the preferred process 2 shown schematically in FIG. 4 of the drawings.

TABLE 3

TEST PARAMETERS

| Run | Temp (°C.) | Pressure (kPa) | Time (min) | Solids Produced (g) |
|---|---|---|---|---|
| HP1 | 200 | 1600 | 61 | 33.2 |
| HP2 | 200 | 1800 | 61 | 30.4 |
| HP3 | 200 | 1400 | 186 | 30.4 |
| HP4 | 200 | 1500 | 181 | 28.6 |
| HP9* | 200 | 2300 | 63 | 22.1 |
| HP11* | 200 | 2200 | 15 | 23.3 |

TABLE 3-continued

| | TEST PARAMETERS | | | |
|---|---|---|---|---|
| Run | Temp (°C.) | Pressure (kPa) | Time (min) | Solids Produced (g) |
| HP6 | 180 | 910 | 180 | 24.5 |
| HP7 | 150 | 350 | 72 | 18.4 |
| HP8* | 150 | 1200 | 79 | 18.2 |
| HP10* | 120 | 910 | 60 | 8.2 |
| HP13* | 110 | 770 | 120 | 6.1 |
| HP43 | 200 | 2100 | 40 | 30.6 |
| HP44 | 200 | 2100 | 40 | 35.5 |
| HP45 | 190 | 2100 | 40 | 29.3 |

*Nitrogen over pressure of 210 kPa.

TABLE 4

| | SAMPLE ANALYSIS | | | | | | | | | | |
|---|---|---|---|---|---|---|---|---|---|---|---|
| Sample | CAO | FE2O3 | P2O5 | AL2O3 | SIO2 | K2O | MGO | NA2O | F | LOF | LOI % |
| HP8 | 0.15 | 0.04 | 0.06 | 47.12 | —0.03 | —0.01 | 0.22 | 0.42 | 26.43 | 26.32 | PPTE* |
| HP9 | 0.20 | 0.05 | 0.04 | 48.92 | —0.04 | —0.00 | 0.21 | 1.08 | 24.31 | 24.01 | PPTE* |
| HP43 | 0.18 | 0.03 | 0.05 | 46.70 | 5.07 | —0.01 | 0.16 | 0.82 | 26.44 | 21.62 | PPTE+ |
| HP44 | 0.43 | 0.09 | 0.04 | 43.13 | 4.23 | —0.00 | 0.14 | 2.40 | 23.58 | 20.82 | PPTE+ |
| HP45 | 0.20 | 0.05 | 0.05 | 46.46 | 4.96 | —0.01 | 0.14 | 0.78 | 24.45 | 22.26 | PPTE+ |

*Process 2 (FIG. 4)
+Process 1 (FIG. 4)

Although the process as outlined can produce a high purity aluminium fluoride product without the use of caustic soda, in certain circumstances it may be advantageous to increase the pH of the leach solution as this may facilitate removal of any residual fluoride from waste solutions. This pH adjustment can be accomplished by the addition of caustic soda, ammonia, caustic magnesia or other basic compounds.

I claim:

1. A process for the recovery of aluminium and fluoride values from spent pot lining materials, comprising the steps of calcining spent pot lining material to produce an ash having environmentally acceptable levels of cyanide contamination, subjecting the ash to a leaching step in a solution containing a mineral acid and a corresponding aluminium salt in such proportions as to dissolve the aluminium and fluoride values, and subjecting the leached liquid to thermal hydrolysis to cause precipitation of an aluminium fluoride product.

2. The process of claim 1, wherein the spent pot lining material is first crushed to a particle size less than 600 micrometers.

3. The process of claim 1 or 2, wherein the mineral acid is selected from hydrochloric, sulfuric or nitric acids, or mixtures thereof, and the corresponding aluminium salt comprises aluminium chloride, aluminium sulphate or aluminium nitrate respectively, or mixtures thereof.

4. The process of claim 3, wherein the amount of aluminium salt used in such that the salt to SPL ash ratio falls substantially in the range 0.1 to 0.8 while the ratio of acid to SPL ash falls substantially in the range 0.1 to 1.2.

5. The process of any preceding claim, wherein the solution contains water in a ratio to ash which falls substantially in the range 5 to 25.

6. The process of any preceding claim, wherein the ash is leached with agitation at a temperature which substantially falls within the range 40° to 100° C. over a period which substantially falls within the range of 5 to 360 minutes.

7. The process of any preceding claim, wherein the aluminium salt is added after the ash has been partially leached with the mineral acid only.

8. The process of any preceding claim, wherein the aluminium salt is produced in-situ by reacting an aluminium compound with the mineral acid.

9. A process for the recovery of spent pot lining materials to recover aluminium and fluoride values comprising mixing the spent pot lining material with a concentrated mineral acid solution, ageing the mixture for a period of up to about 24 hours to prevent dissolution of the silica contained in the mixture, leaching the mixture by the addition of an aluminium salt corresponding to the mineral acid in such proportions as to dissolve the aluminium and fluoride values, and subjecting the leached liquid to thermal hydrolysis in the presence of an inert atmosphere or vacuum to prevent precipitation of the iron in the leached liquid and to cause precipitation of a product containing aluminium and fluoride values.

10. The process of claim 9, wherein the spent pot lining material is calcined to produce an ash having environmentally acceptable levels of cyanide contamination before the first step in the process.

11. A process for the recovery of aluminium and fluoride values from spent pot lining materials, comprising the steps of calcining, spent pot lining material to produce an ash having environmentally acceptable levels of cyanide contamination, mixing the ash with concentrated sulfuric acid, adding water and allowing the resultant solution to age at temperatures about falling in the range of about ambient to about 150° C. for a time period of up to twenty four hours, leaching the aged solution with an aluminum sulphate solution to produce a solution having an $Al_2(SO_4)_3/H_2SO_4$ ratio falling within the of about range 0.75 to about 1 at temperatures up to about 100° C. for a time period up to about 3 hours, filtering the leached liquor from the residue to separate a carbon and silicate residue, placing the filtrate in an autoclave from which air is of about excluded, and adjusting the over-pressure within the autoclave to prevent precipitation of iron oxide, heating the contents of the autoclave with agitation at temperatures falling within the range of about 105° C. to about 265° C. at a corresponding pressure of about 20 KPa to about 5000 KPa for a holding time sufficient to cause hydrothermal precipitation, and filtering the contents of the autoclave to separate the aluminium and fluoride values.

* * * * *